United States Patent Office 3,397,600
Patented Aug. 20, 1968

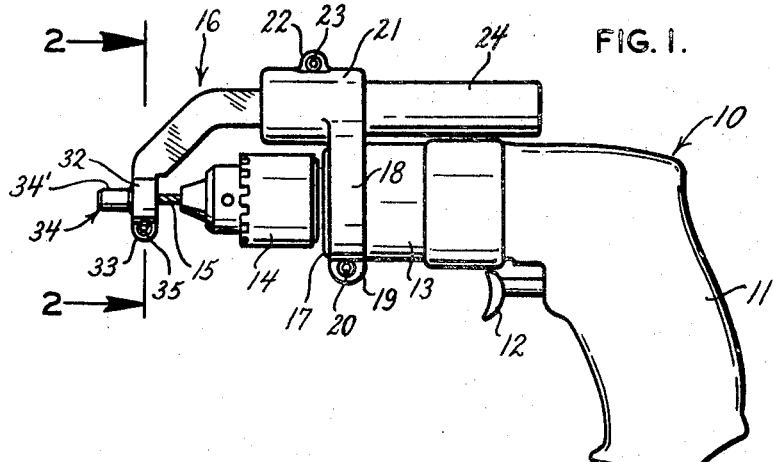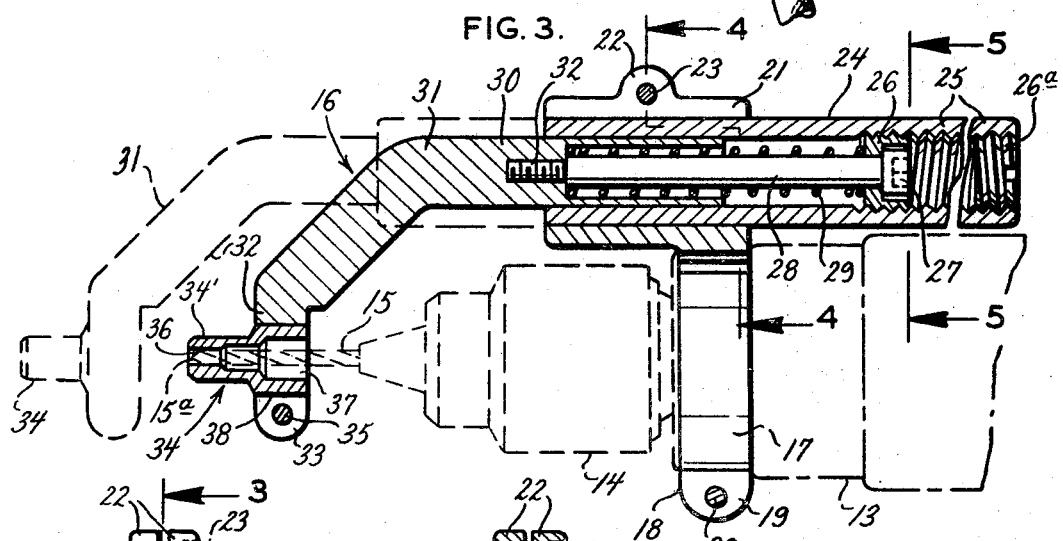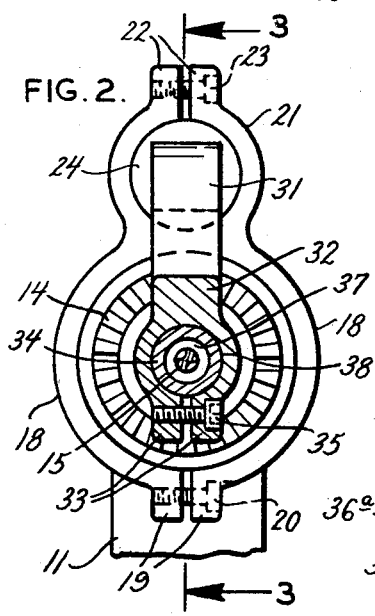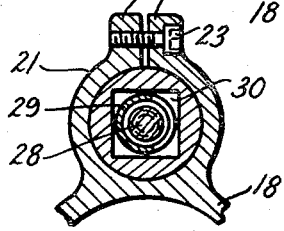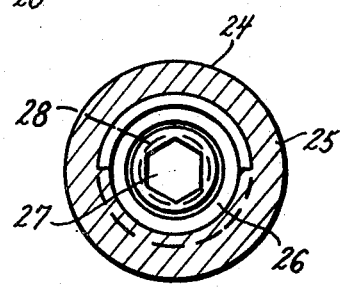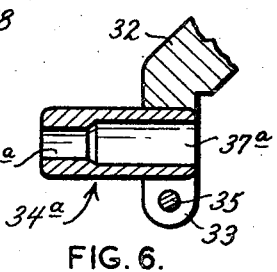
INVENTOR.
WESLEY G. WELLS

3,397,600
BUSHING ADAPTER FOR DRILL UNITS
Wesley G. Wells, Hazelwood, Mo., assignor to McDonnell Aircraft Corporation, St. Louis, Mo., a corporation of Maryland
Filed Mar. 18, 1966, Ser. No. 535,399
1 Claim. (Cl. 77—7)

ABSTRACT OF THE DISCLOSURE

An adapter device for movably supporting guide bushings on a power tool so that the guide bushing may be adjustably disposed in advance of the drill or reamer mounted in the power tool chuck. The guide bushing is intended to yield on advance of the power tool into the work and to limit the amount of yielding in order to control the inward stroke of the drill or reamer.

---

This invention relates to improvements in guide bushing adapters for drill units.

In hand drilling or reaming operations, the production part to have holes formed therein is first applied with a guide template locating the holes as they are desired in the production part. The guide template may or may not have bushings fitted into the holes to take the wear. In using power drills of hand held types, the guide template is only a positioning means and the drill is equipped with a guide that fits into a guide hole. The guide bushing does not rotate in the template so that wear is not a factor. The problem with existing bushing adapters used in conjunction with hand held power drill units is that there is no adjustment for the drill and reamer lengths which satisfies both new and resharpened cutting tools. It is also known that the guide means is liable to become clogged with drillings which impair the results.

An important object of the present invention is to provide an improved adapter device for hand operated power drills which will overcome the problems recognized with heretofore available devices.

It is an important object of the present invention to provide a simple trouble-free adapter device for supporting guide bushings on hand operated power drills, and to provide a structure which will not interfere with substantially full and complete access to the drill chuck for installing and removing drills or reamers.

It is another object of this invention to provide a guide bushing adapter which is easily adjusted to permit the use of new or resharpened drills or reamers so that the cutting tools may be used for a longer time before being discarded.

Other objects of this invention reside in the parts and components hereinafter described and claimed, having reference to the specification and the accompanying drawing, wherein;

FIG. 1 is a side elevational view of a hand operated power drill equipped with the adapter device of this invention;

FIG. 2 is a partial sectional view from the front of the drill, as seen on an enlarged scale at line 2—2 in FIG. 1;

FIG. 3 is a fragmentary longitudinal sectional view taken at line 3—3 in FIG. 2;

FIG. 4 is a fragmentary transverse sectional view taken at line 4—4 in FIG. 3;

FIG. 5 is a transverse sectional view taken at line 5—5 in FIG. 3; and

FIG. 6 is a fragmentary longitudinal sectional view, on an enlarged scale, of the guide bushing supported in the adapter of this invention.

In FIG. 1, the power drill of conventional pistol grip type is seen at 10 to have the handle 11, control element 12, motor case 13, drill chuck 14, and a twist drill 15 set in the chuck 14. All of these parts are well known and require no further description.

The adapter 16 of this invention (FIGS. 1, 2 and 3) is removably clamped to the forward portion 17 of the motor case 13 by a split ring 18 having its ends 19 joined by a securing screw 20. The ring 18 is an integral part of elongated split clamp 21 having its ends 22 secured by a screw 23. The split clamp holds a cylinder 24 which is open at its ends, the rearmost end being internally threaded at portion 25 and the greater part of the remaining length of the cylinder being smooth bored. The cylinder 24 has its axis substantially parallel to the axis of the drill 15 and the axis of the chuck 14 on the motor case 13. As seen in FIG. 3 the cylinder 24 may be adjustably held by the split clamp 21 in its most rearwardly set position in full line, in a most forwardly set position in broken lines, and, of course, intermediate positions.

The adapter cylinder 24 carries an abutment plug 26 and a depth stop plug 26a each threaded into portion 25. The plug 26 is recessed to receive in countersunk relation the head 27 of a guide element 28 for a coiled spring 29 caged in the cylinder bore between the plug 26 and the inner end 30 of a bushing holder arm 31. The inner end 30 slides in the smooth bore of cylinder 24 and is connected by threaded engagement with the threaded portion 28' of guide 28. The inner end 30 of the arm 31 is square or rectangular or non-circular in section, as seen in FIG. 4, and the bore of cylinder 24 is broached to match the shape of the arm so that no rotation or turning of the arm can occur.

The arm 31 projects forwardly and downwardly to end 32 which is in front of the drill chuck 14, and this end is split at 33 to receive one of a number of guide bushings 34. The split ends 33 are secured by a threaded element 35. The function of arm 31 is to hold the drill guide bushing 34 in axial alignment with the drill 15 and to permit the bushing to be set relative to the drill point by sliding rearwardly in cylinder 24 so that the tip of drill 15 can project through the bushing and enter the work-piece. Since there is the spring 29 in the cylinder 24 the end 30 of the arm will normally hold the bushing 34 properly for the length of twist drill 15, but upon pressure being applied on the bushing 34 the arm 31 will cause the spring to yield and the twist drill 15 will project from the bushing 34. The depth of drilling is controlled by the setting of the abutment plug 26a in the portion 25 of the cylinder 24. The plug 26a is abutted by the head 27 on guide 29 as the end 30 of the adapter 16 slides rearwardly.

The cylinder 24 is adjustable in the split body 21 to initially set the arm 31 with its end 32 more or less spaced from the drill chuck 14. Thereafter the spring 29 will yield to pressure on the arm 31 at end 32 and allow the end 32 to move toward the chuck 14 to expose the end of the twist drill more or less, as the setting of abutment plug 26a may be.

In FIGS. 3 and 6 there are shown two sizes of bushings, the bushing 34 in FIG. 3 has a smaller ouside diameter 34; than that for the bushing 34a in FIG. 6. For example, the range of diameters for drills and reamers to be used in chuck 14 can be accommodated by two bushings which provide for a variety of I.D.'s. Bushing 34 may have an outside diameter of 5/16 inch and the bushing 34a of FIG. 6 may have an outside diameter much larger, or of ½ inch. In order to accommodate both bushings, the smaller one 34 has an enlarged diameter 38 equivalent to the diameter of bushing 34a. There are usually provided a series of constant outside diameter small bushings 34 having different bores 36 and 37, and another series of constant but larger outside diameter bushings 34a having different internal bores 36a and 37a.

In use the adapter 16 is adjusted by locating the cylinder 24 in clamp 21 so that the point 15a of the drill 15 (FIG. 3) is flush with the outer end of bushing 34. This setting is different for original and regrind drills of the same diameter size due to loss of drill length, and the setting also varies for drill size due to increased drill length as the diameter increases. In mounting the arm end 30 in in the cylinder 24, the plug 26 is seated at the bottom of the threaded portion 25 so that the head 27 of the guide 28 will not project far enough out of the end portion 25 to be dangerous to the operator.

The foregoing specification has described a power drill unit as if it were only for drilling. However, more meaningful generic terminology would be to call the unit 10 a power tool so as not to limit its scope just to drilling purposes.

There has been described an adapter for drills which has the advantages of being adjustable, of avoiding obstructing the drill chuck, of being simple and free of malfunction due to drillings ganging up in the working parts and of being adaptable to extend the service life of drills.

What is claimed is:

1. In a power tool unit having a motor housing, a tool receiving chuck operably connected into the motor housing and a tool element in the chuck projecting forwardly of the motor housing, the improvement of; an elongated cylinder carried on the motor housing and positioned to one side of the tool receiving chuck with its axis parallel to the axis of the tool element, an arm carried by said cylinder and having one end projecting forwardly of and spaced from the tool receiving chuck to intersect the axis of the tool element and an opposite end slidably received in said cylinder, a bushing having a tool element supporting bore therethrough, said bushing being carried by said one end of said arm to receive the tool element in said supporting bore, and control means carried by said cylinder to engage said opposite end of said arm and yieldably position said one end of said arm spaced from the chuck, said control means including an elongated spring having one end engaged on said opposite end of said arm, an abutment element axially adjustably carried by said cylinder in position to receive the opposite end of said spring, means to guide said spring engaged with said arm and slidable in said abutment element, and stop means axially adjustably movable in said cylinder to limit the sliding stroke of said guide means and hence the movement of said bushing relative to the tool chuck.

References Cited

UNITED STATES PATENTS

| 1,674,867 | 6/1928 | Krag | 77—55 |
| 1,831,813 | 11/1931 | Levedahl | 77—7 XR |
| 2,674,906 | 4/1954 | Timpner | 77—55 |
| 2,994,235 | 8/1961 | Rise | 77—55 |

FRANCIS S. HUSAR, *Primary Examiner.*